United States Patent Office 2,829,138
Patented Apr. 1, 1958

2,829,138

AZO DYESTUFFS CONTAINING HEAVY METAL

Werner Kuster, Basel, Switzerland, assignor to J. R. Geigy A.-G., Basel, Switzerland No Drawing. Application June 18, 1956
Serial No. 592,471

Claims priority, application Switzerland June 23, 1955

6 Claims. (Cl. 260—146)

The present invention concerns the production of azo dyestuffs containing heavy metal as well as the use thereof for the fast dyeing of natural and synthetic polypeptide fibres, and finally, it concerns the material fast dyed with the aid of these dyestuffs.

It has been found that valuable azo dyestuffs containing heavy metal are obtained if diazonium compounds of the benzene series which contain in the o-position to the diazonium group a substituent capable of taking part in the metal complex formation or a substituent which can be converted into such a group and which contain no further acid water solubilising groups—apart from those taking part in the complex formation—such as, for example the carboxyl and the sulphonic acid group, are coupled with 7'-hydroxynaphthazoles of the general Formula I

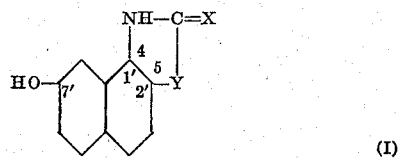

and the monoazo dyestuffs so obtained are finally treated with agents giving off heavy metal.

In this formula X represents an oxygen or a sulphur atom and Y represents an oxygen atom or an NH-group.

7'-hydroxynaphthazoles corresponding to the general Formula I are 7'-hydroxynaphtho-1'.2':4.5-oxazolone, 7'-hydroxynaphtho-1'.2':4.5-imidazolone and the corresponding imidazole thion and oxazole thion derivatives. The production of these compounds has already been described in the literature.

The usual 2-amino-1-carboxybenzene and, in particular the 2-amino-1-hydroxybenzene compounds are usable as diazo components according to the present invention. These compounds may be substituted, for example by halogen, alkyl, alkoxy, nitro, acylamino, alkyl or aryl sulphonyl, acyl, sulphonic acid amide, sulphonic acid-N-alkyl, —N-hydroxyalkyl, —N-dialkyl, —N-aryl or —N-arylalkyl amide groups but they made not contain any sulphonic acid groups and carboxyl groups not taking part in the metal complex formation.

These compounds are diazotised and the diazonium compounds obtained are coupled with the azo components usable according to the present invention by the usual methods which are known per se.

The monoazo dyestuffs obtained are metallised in aqueous or organic solution or suspension, advantageously while heating. Also they may be metallised in a melt of low fatty acid amides such as, for example, formamide, dimethyl formamide or acetamide. In particular organic and inorganic salts and complex compounds of chromium and cobalt are used as agents giving off heavy metal, for example chromic and cobalt acetate or sulphate, hexammine cobaltitrichloride or alkali or ammonium salts of chromosalicylic acid. The azo dyestuffs are so treated with such amounts of agents giving off heavy metal that there is at least one heavy metal atom to two monoazo dyestuff molecules, care being taken towards the end of the metallisation to avoid a mineral acid reaction of the medium. If desired, the metallised dyestuffs are finally converted into their alkali salts, for example into the lithium, sodium, potassium or ammonium salts. This is done by means of alkalies or salts having an alkaline reaction such as, for example potassium or sodium carbonate or trisodium phosphate.

The chromium and cobalt containing monoazo dyestuffs according to the present invention dissolve in hot water and draw very well from a neutral to acid bath onto natural and synthetic polypeptide fibres such as wool, silk, polyamide and polyurethane fibres. They dye these fibres in valuable grey, blue-grey to blue shades which have good fastness to light and milling.

The following examples illustrate the invention without limiting it in any way. Parts are given as parts by weight and the temperatures are in degrees centigrade. The relationship of parts by weight to parts by volume is as that of kilogrammes to litres.

EXAMPLE 1

20.1 parts of 2-amino-1-hydroxybenzene-4-ethyl sulphone are pasted in 200 parts of water and 15 parts of concentrated hydrochloric acid and diazotised at a temperature not exceeding 5° with 6.9 parts of sodium nitrite in 35 parts of water. On completion of the diazotisation, the mineral acid reaction of the diazonium suspension is buffered by the addition of sodium bicarbonate until congo red paper is no longer coloured blue. A solution of 20.6 parts of 7'-hydroxynaphtho-1'.2':4.5-oxazolone and 4.1 parts of sodium hydroxide in 250 parts of water and 75 parts of pyridine is then poured into this diazonium compound within half an hour. During the coupling the temperature should not exceed 5°. The temperature of the mixture is allowed to rise overnight to 20°, then the completely formed dyestuff is drawn off under suction and washed with 5% sodium chloride solution.

The chromium containing dyestuff is produced according to the following method:

The filter cakes of the coupling are pasted in 1000 parts of water and 10 parts of 25% ammonia and then, at 80°, 100 parts by volume of a solution of ammonium disalicylato chromiate, corresponding to 3 parts of chromium, are added and the whole is heated for 6-8 hours at 95-100°. 80 parts of sodium chloride are added, the complex chromium compound which has practically completely precipitated is filtered off at 70°, washed with 5% sodium chloride solution and dried.

The chromium containing dyestuff is a black powder which dissolves in hot water with a blue-grey and in concentrated sulphuric acid with a violet colour. It dyes wool from a neutral to weakly acid bath in blue-grey shades. The wool dyeings are fast to light and have very good wet fastness properties.

The cobalt containing dyestuff is produced as follows:

The filter cakes of the coupling according to paragraph 1 are pasted in 1000 parts of water and 10 parts of 25% ammonia. 100 parts by volume of an aqueous solution of cobalt acetate, corresponding to 3.5 parts of cobalt, are added at 80°. The whole is then kept for 6 hours at 95-100° whereupon the reaction is made weakly alkaline with some sodium bicarbonate. The cobalt containing dyestuff is precipitated by the addition of 90 parts of sodium chloride, filtered off at 80°, washed with 5% sodium chloride solution and dried.

It is a dark, brown-violet powder which dissolves in hot water with a violet and in concentrated sulphuric acid with a red-violet colour. It dyes wool from a neutral to weakly acid bath in brown-violet shades which have very good fastness properties.

EXAMPLE 2

26.4 parts of 2-amino-1-hydroxybenzene-4-sulphonic acid phenylamide are dissolved with 4 parts of sodium hydroxide in 200 parts of water. A solution of 6.9 parts of sodium nitrite in 40 parts of water is then added and the mixture is added dropwise at a temperature not exceeding 5° to 25 parts by volume of concentrated hydrochloric acid and 100 parts of water. On completion of the diazotisation, the acidity of the diazo suspension is buffered with sodium bicarbonate until congo red paper is no longer coloured blue whereupon a solution of 21 parts of 7'-hydroxynaphtho-1'.2':4.5-oxazolone and 4.1 parts of sodium hydroxide in 250 parts of water and 75 parts of pyridine is added. The temperature of the mixture is allowed to rise overnight from 5° to 20°. The completely formed dyestuff is separated by the addition of 30 parts of sodium chloride, filtered off and washed with 5% sodium chloride solution.

The chromium containing dyestuff is produced as follows:

The filter cakes of the coupling are pasted in 1000 parts of water and 10 parts of 25% ammonia; 100 parts by volume of a solution of ammonium disalicylato chromiate, corresponding to 3 parts of chromium, are added at 80° and the whole is heated for 6-7 hours at 95-100°. 40 parts of sodium chloride are then added and the practically completely precipitated chromium compound of the dyestuff is filtered off at 80°, washed with 5% sodium chloride solution and dried.

The chromium containing dyestuff is a grey-black powder which dissolves in hot water with a reddish-grey and in concentrated sulphuric acid with a red-violet colour. It dyes wool from a neutral to weakly acid bath in grey shades which have very good wet and light fastness properties.

In the following table further valuable metal containing dyestuffs according to the present invention are listed which are obtained by using the methods described in Examples 1 and 2.

Table

| Diazo component | Coupling component | Metal | Shade of dyeing on wool |
|---|---|---|---|
| 2-amino-1-hydroxybenzene-4-sulphonic acid methyl amide. | 7'-hydroxynaphtho-1'.2':4.5-oxazolone. | Cr | grey. |
| Do | 7'-hydroxynaphtho-1'.2':4.5-imidazolone. | Cr | blue-grey. |
| Do | 7'-hydroxynaphtho-1'.2':4.5-oxazole thion. | Cr | reddish-grey. |
| 2-amino-1-hydroxybenzene-4-sulphonic acid dimethyl amide. | 7'-hydroxynaphtho-1'.2':4.5-oxazolone. | Cr | grey. |
| Do | ---do--- | Co | brown-violet. |
| 2-amino-1-hydroxybenzene-5-sulphonic acid methylamide. | ---do--- | Cr | grey-blue. |
| Do | 7'-hydroxynaphtho-1'.2':4.5-imidazolone. | Cr | blue. |
| 2-amino-1-hydroxybenzene-4-chloromethyl sulphone. | ---do--- | Cr | grey-blue. |
| Do | 7'-hydroxynaphtho-1'.2':4.5-oxazolone. | Cr | reddish-grey. |
| Do | ---do--- | Co | brown-violet. |
| Do | 7'-hydroxynaphtho-1'.2':4.5-oxazole thion. | Cr | reddish-grey. |
| 4-chloro-5-nitro-2-amino-1-hydroxybenzene. | 7'-hydroxynaphtho-1'.2':4.5-oxazolone. | Cr | greenish-blue. |
| 5-nitro-2-amino-1-hydroxybenzene. | ---do--- | Co | blue. |
| 5-chloro-2-amino-1-hydroxybenzene. | ---do--- | Cr | blue-violet. |
| 4-chloro-5-nitro-2-amino-1-hydroxybenzene. | 7'-hydroxynaphtho-1'.2':4.5-oxazolone. | Co | blue. |
| 5-nitro-2-amino-1-hydroxybenzene. | 7'-hydroxynaphtho-1'.2':4.5-imidazolone. | Co | greenish-blue. |
| 5-chloro-2-amino-1-hydroxybenzene. | 7'-hydroxynaphtho-1'.2':4.5-oxazolone. | Co | violet. |
| 2-amino-1-hydroxybenzene-4-sulphonic acid phenylamide. | ---do--- | Co | blueish-violet. |

EXAMPLE 3

10 parts of previously wetted wool are entered at 40° into a dyebath containing in 400 parts of water, 0.2 part of the chromium containing dyestuff according to Example 2, 1 part of anhydrous sodium sulphate and 0.3 part of ammonium acetate. The bath is brought to the boil and kept boiling until the liquor is practically exhausted, which is for about 1 hour. The wool which has been dyed a strong grey colour is rinsed and dried. A reddish-grey wool dyeing is obtained which has very good wet and light fastness properties.

Wool dyeings of the metal containing dyestuffs according to the other example and the table are obtained in a similar manner.

What I claim is:

1. A metalliferous compound which contains one atom of a metal selected from the group consisting of cobalt and chromium in complex union with two molecules of a monoazo dyestuff which is free from sulphonic and carboxylic acid groups and corresponds to the formula:

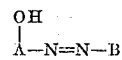

wherein A represents a mononuclear radical of the benzene series bound to the azo group in ortho-position to the hydroxyl group, and B represents a member selected from the group consisting of:

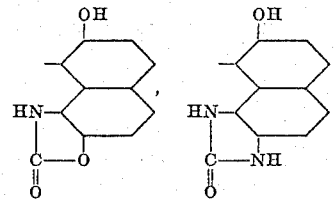

and

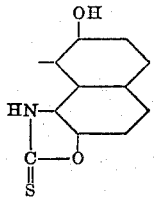

2. The complex chromium compound which contains one atom of chromium bound in complex union to two molecules of a dyestuff of the formula:

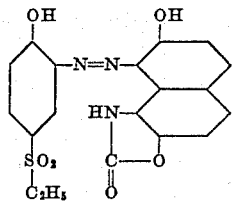

3. The complex chromium compound which contains one atom of chromium bound in complex union to two molecules of a dyestuff of the formula:

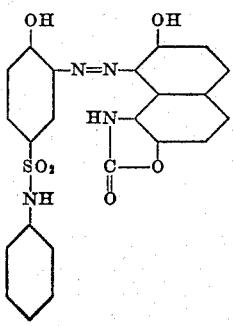

4. The complex chromium compound which contains one atom of chromium bound in complex union to two molecules of a dyestuff of the formula:

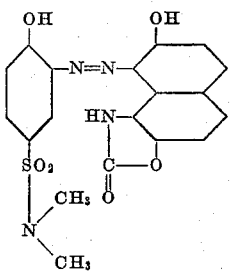

5. The complex chromium compound which contains one atom of chromium bound in complex union to two molecules of a dyestuff of the formula:

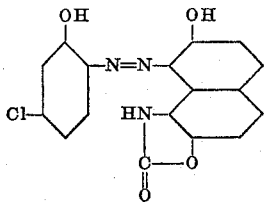

6. The complex cobalt compound which contains one atom of cobalt bound in complex union to two molecules of a dyestuff of the formula:

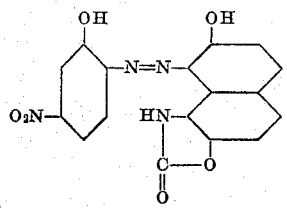

References Cited in the file of this patent
UNITED STATES PATENTS
2,055,741   Ballauf _____ Sept. 29, 1936

OTHER REFERENCES

Venkataraman: Synthetic Dyes, 1952, page 540.